July 5, 1966 G. L. HOBROUGH 3,259,758

SUM AND DIFFERENCE CIRCUIT

Filed Sept. 13, 1963

INVENTOR.
GILBERT L. HOBROUGH
BY Stanley Belsky
Bialos & Schlemmer
ATTORNEYS

United States Patent Office 3,259,758

Patented July 5, 1966

3,259,758
SUM AND DIFFERENCE CIRCUIT

Gilbert Louis Hobrough, Los Altos, Calif., assignor to Itek Corporation, Lexington, Mass., a corporation of Delaware Filed Sept. 13, 1963, Ser. No. 308,776
12 Claims. (Cl. 307—88.5)

This invention relates to a sum and difference or hybrid circuit and, more particularly, to a circuit operative to accept two input signals and develop two output signals therefrom—one of which is proportional to the sum of the two input signals, and the other of which is proportional to the difference therebetween.

Electrical devices for performing arithmetic additions and substractions of two signals to produce both the sum thereof and difference therebetween are known, and their use in certain telephony circuits is an environmental example. Generally, such arithmetic functions are performed by transformers having a plurality of primary and secondary coils oriented and arranged to accept two input signals and deliver the two desired output signals. However, such transformer arrangements are limited in usefulness in that they are able to accommodate signals having only relatively limited band widths and, therefore, are unable to accommodate signals of wide band width as, for example, sharp saw-tooth waveforms of the type that might be used in generating the scanning pattern for a cathode ray tube.

It is, accordingly, an object of the present invention, among others, to provide a circuit operative to perform the hybrid function of accepting two input signals each of which may have a relatively wide band width as, for example, in the order of from zero frequency to about 2 megacycles, and delivering two output signals respectively corresponding to the sum and difference of the input signals.

Embodiments of the invention are illustrated in the accompanying drawing, in which.

In the subsequent description, only the circuit of FIGURE 1 will be considered in detail; and concerning the circuit of FIGURE 2, the components thereof respectively corresponding to those of the circuit shown in FIGURE 1 will be identified with the primed form of the same numerals.

Figures 1, 2:
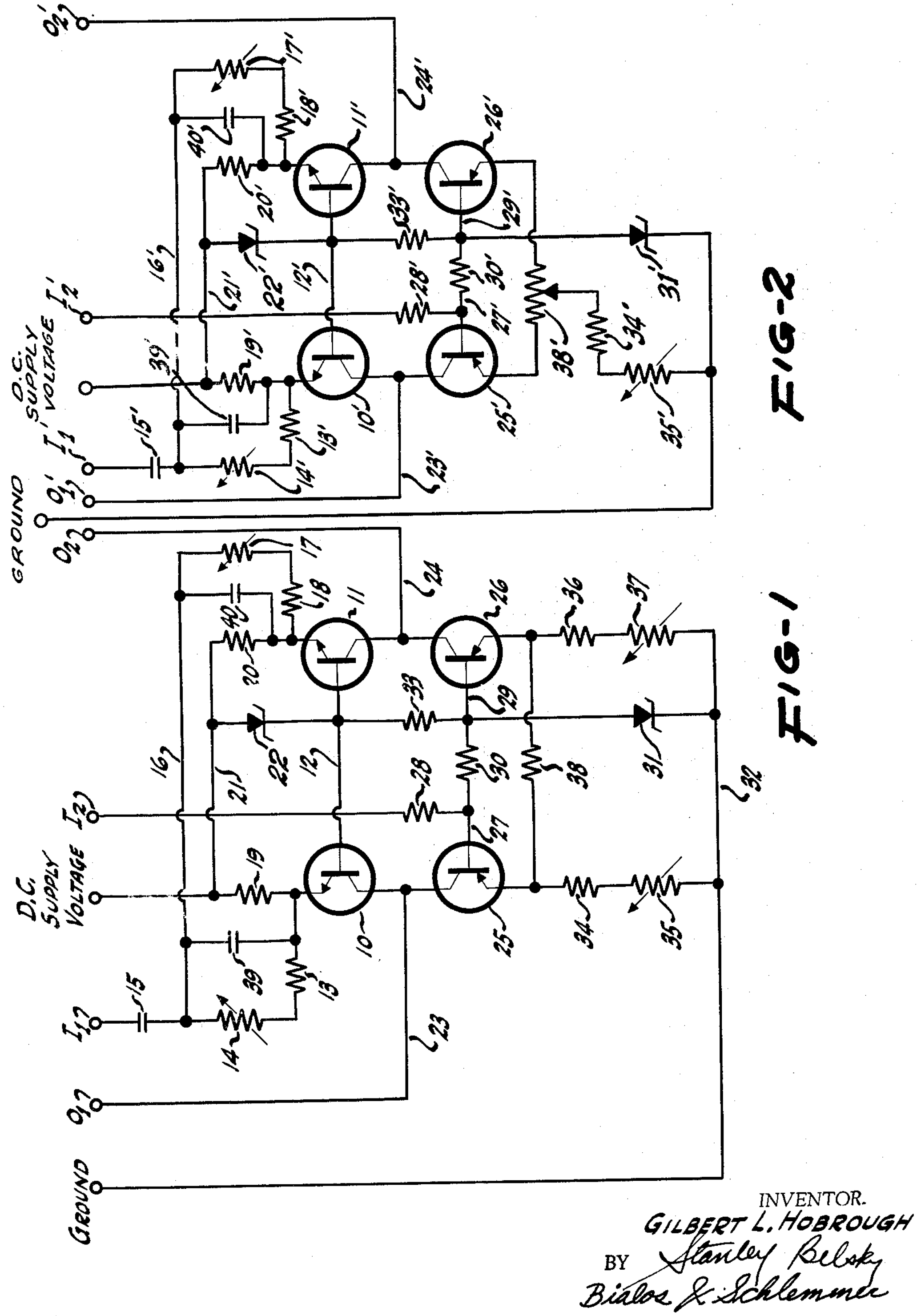
FIG. 1 is a schematic circuit diagram of a hybrid circuit.
FIGURE 2 is a schematic circuit diagram of a modified hybrid circuit.

The circuit illustrated in FIGURE 1 includes a pair of transistors 10 and 11, the bases of which are directly coupled by a conductor 12. The emitter of the transistor 10 is connected to an input terminal $I_1$ through a fixed resistance 13, variable resistance 14 and capacitance 15, all of which are connected in series. The common point between the variable resistance 14 and capacitance 15 is connected to a conductor 16 which is coupled to the emitter of the transistor 11 through a variable resistance 17 and fixed resistance 18 in series therewith. The emitters of the transistors 10 and 11 are respectively connected through resistances 19 and 20 to a conductor 21 leading to a source of D.C. supply voltage, as indicated. Thus, the emitter networks of the transistors 10 and 11 are symmetrically related and are connected to the input terminal $I_1$ through the common capacitance 15.

The base elements of the transistors 10 and 11 are maintained at a constant potential by a reference device providing a constant voltage drop thereacross, such as the Zener diode 22, the cathode of which is connected to the conductor 21 and the anode to the conductor 12 (that is, the base elements of the transistors). The collector of the transistor 10 is directly connected by a conductor 23 to an output terminal $O_1$. Similarly, the collector of the transistor 11 is directly connected by a conductor 24 to an output terminal $O_2$. Evidently, then, an input signal appearing at the terminal $I_1$ is delivered to the emitters of both of the transistors 10 and 11, and such signal as amplified by the transistors 10 and 11 is delivered to the output terminal $O_1$ from the collector of the transistor 10 and to the output terminal $O_2$ from the collector of the transistor 11.

The circuit further includes a pair of transistors 25 and 26; and the collector of the transistor 25 is commonly connected with the collector of the transistor 10 to the output terminal $O_1$ by the conductor 23, and the collector of the transistor 26 is commonly connected with the collector of the transistor 11 to the output terminal $O_2$ by the conductor 24. The base of the transistor 25 is connected by a conductor 27 and fixed resistance 28 to an input terminal $I_2$. However, the base of the transistor 26, although coupled to the base of the transistor 25 through a conductor 29 and resistance 30—the latter of which is connected to the conductor 27, is isolated from the input terminal $I_2$ by the resistance 30. The base of the transistor 26 and base of the transistor 25 (the latter through the resistance 30) are both maintained at a constant potential by a reference device providing a constant voltage drop thereacross, such as the Zener diode 31, the cathode of which is connected to the conductor 29 and the anode to ground as represented by the conductor 32. A resistance 33 is connected in series between the two diodes 22 and 31, and serves to determine the current flow therethrough.

The emitter of the transistor 25 is connected to ground by a fixed resistance 34 and variable resistance 35 in series therewith; and in a similar manner, the emitter of the transistor 26 is connected to ground through a fixed resistance 36 and variable resistance 37 in series therewith. The two emitters of the transistors 25 and 26 are connected by a coupling resistance 38 which serves to deliver waveforms appearing on the emitter of the transistor 25 to the emitter of the transistor 26.

A pair of compensating capacitances 39 and 40 are respectively connected between the conductor 16 and the emitter of the transistor 10 and between the conductor 16 and the emitter of the transistor 11, and the purpose of each is to provide compensation for shunt capacitance elsewhere in the circuitry.

In the function of the circuit, the variable resistances 35 and 37 are used to respectively adjust the value of the direct current flow through the serially arranged transistors 10–25 and 11–26. The variable resistances 14 and 17 are used to respectively adjust the level of the input signal supplied to the emitters of the transistors 10 and 11 from the input terminal $I_1$. The capacitance 15 serves to provide D.C. isolation between the input terminal $I_1$ and the emitters of each of the transistors 10 and 11. The resistances 28 and 30 comprise an attenuation network to reduce the level of the input signal from the terminal $I_2$ to a suitable lower value. The resistance 38 interconnecting the emitters of the transistors 25 and 26 is used to control the amplification of and separation between the current flow adjustments provided by the variable resistances 35 and 37.

In operation of the circuit, a voltage signal appearing at the input terminal $I_1$ is applied to the emitters of the transistors 10 and 11; and since the base of each of these two transistors is maintained at a constant potential by the reference action of the diode 22, the input signal applied to each of the transistors appears in amplified form at the collectors thereof and, therefore, in amplified form at each of the output terminals $O_1$ and $O_2$.

The transistors 25 and 26 are connected in an emitter-coupled phase-inverter configuration, and therefore a signal voltage appearing at the input terminal $I_2$ and which is applied to the base of the transistor 25 is duplicated on the emitter of that transistor by emitter follower action. Such duplicate voltage signal appearing on the emitter of the transistor 25 is applied through the resistance 38 to the emitter of the transistor 26, the base of which is maintained at a constant potential by the reference diode 31. As a result of the amplification provided by the transistor 25, the input voltage signal applied to its base appears on the collector thereof in inverted amplified form and, therefore, at the output terminal $O_1$; and as a result of the amplification provided by the transistor 26, the non-inverted voltage signal applied to its emitter appears on the collector thereof in non-inverted amplified form and, therefore, at the output terminal $O_2$.

Evidently then, an input signal present at the terminal $I_1$ appears at each of the output terminals $O_1$ and $O_2$ in amplified form and identical phase. However, an input signal present at the terminal $I_2$ will appear at the output terminal $O_2$ in amplified form and at the output terminal $O_1$ in amplified form but in opposite-phase relationship. Therefore, the total output signal at the terminal $O_2$ is proportional to the sum of the input signals present at the terminals $I_1$ and $I_2$, and in the present instance is the sum of the amplified input signals; and the total output signal at the terminal $O_1$ is proportional to the difference between the input signals present at the terminals $I_1$ and $I_2$, and in the present instance is the difference between the amplified input signals.

In the specific circuit shown, the transistors 10 and 11 each have one input and one output respectively defined by the emitters and collectors thereof, and such transistors function to provide amplified duplicates at the output terminals $O_1$ and $O_2$ of the input signal applied to the emitters—the two output signals having the same phase relationship. Especially where it is unnecessary to provide amplified duplicates of the input signal appearing at the terminal $I_1$, or where it is unnecessary or undesirable for the circuit to have a high impedance output (which is provided by the arrangement comprised by the transistors 10 and 11), other means may be employed to obtain the same-phase output signals at the terminals $O_1$ and $O_2$ from the input signal appearing at the terminal $I_1$ as, for example, a resistance network. Also, the capacitance 15, which serves to provide D.C. isolation between the input terminal $I_1$ and the emitters of the transistors 10 and 11, can be omitted where it is desired to have an input signal extending to zero frequency applied to the terminal $I_1$; and in this respect, it may be noted that no corresponding capacitance is included in the conductor network connecting the terminal $I_2$ with the base of the transistor 25.

The transistor 25 has one input which is defined by the base thereof in the particular circuit illustrated but has two outputs, one of which appears at the collector element (and at the output terminal $O_1$) as an inverted amplified reproduction of the input signal because of the base-to-collector characteristics of the transistor. The second output is defined by the emitter and the voltage signal appearing thereat is a duplicate of the input signal applied to the base 27. Such duplicate signal in being applied to the emitter of the transistor 26 is duplicated in amplified form at the collector thereof, and therefore at the output terminal $O_2$. Thus, the transistor 26 (like the transistors 10 and 11) has a single input and a single output respectively defined by the emitter and collector elements.

The modified circuit shown in FIGURE 2 is identical to the circuit of FIGURE 1 in all respects except as concerns the operating point adjustments—that is to say, in the circuit of FIGURE 1, adjustment of the variable resistance 35 changes the value of the direct current flow through the serially arranged transistors 10 and 25; and in a similar manner, adjustment of the variable resistance 37 changes the value of the direct current flow through the serially arranged transistors 11 and 26. In the circuit of FIGURE 2, the coupling resistance 38′ has an adjustable tap, and the emitters of both of the transistors 25′ and 26′ are connected to ground through such adjustable tap and through the two serially related resistances 34′ and 35′, the latter of which is adjustable. Accordingly, adjustment of the resistance 35′ changes the value of the direct current flow through the serially arranged transistors 10′ and 25′ and also through the serially related transistors 11′ and 26′; and in each instance the change is in the same direction—that is to say, if the value of the variable resistance 35′ is decreased, the direct current flowing through each transistor branch will be increased, and vice versa.

However, any change in the value of the variable resistance 38′ will change the value of the direct current flowing through each of the transistor branches, but in opposite directions. In this respect, if the adjustable tap is moved toward the right (as viewed in FIGURE 2), the series resistance in the transistor branch 10′–25′ will be increased and the direct current flow therethrough will be correspondingly decreased; and at the same time, the series resistance in the transistor branch 11′–26′ will decrease and the direct current flow therethrough will correspondingly increase. Simultaneously varying the current flows inversely through the two transistor branches is convenient in certain environments, but does not alter the basic addition and subtraction functions of the hybrid circuit.

The illustrative hybrid circuits are advantageously used where a high output impedance is required to feed a succeeding stage and generally where the input signals have relatively wide band widths.

For purposes of presenting a specific example of component values in a typical illustrative circuit, the following may be considered:

| | |
|---|---|
| Transistor **10** | 2N718. |
| Transistor **11** | 2N718. |
| Transistor **25** | 2N2189. |
| Transistor **26** | 2N2189. |
| Reference diode **22** | 10 v. Zener diode IN758. |
| Reference diode **31** | 10 v. Zener diode IN965. |
| Resistance **13** | 10K ohms. |
| Resistance **14** | 5K ohms. |
| Resistance **17** | 5K ohms. |
| Resistance **18** | 10K ohms. |
| Resistance **19** | 3.3K ohms. |
| Resistance **20** | 3.3K ohms. |
| Resistance **28** | 10K ohms. |
| Resistance **30** | 470 ohms. |
| Resistance **33** | 2.2K ohms. |
| Resistance **34** | 3.9K ohms. |
| Resistance **35** | 2K ohms. |
| Resistance **36** | 3.9K ohms. |
| Resistance **37** | 2K ohms. |
| Resistance **38** | 220 ohms. |
| Capacitance **15** | 6.8 microfarads. |
| Capacitance **39** | 10 picofarads. |
| Capacitance **40** | 10 picofarads. |
| Resistance **34′** | 3.9K ohms. |
| Resistance **35′** | 1.0K ohms. |
| Resistance **38′** | 1.0K ohms. |
| Supply voltage | −48 volts D.C. |

It should be appreciated that the specific circuit values set forth imply no criticality and can be varied greatly depending upon internal and external parameters, the choice of transistors, and the precise function intended for the circuit in any environmental setting, etc.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

I claim:

1. A circuit for accepting first and second input signals to develop two output signals therefrom one of which is proportional to the approximate arithmetic sum of and the other of which is proportional to the approximate arithmetic difference between the two input signals, comprising: first and second input means adapted to have such first and second input signals respectively applied thereto, a pair of output means, a signal duplication network interconnecting said first input means with said pair of output means for delivering to each a duplicate of such first input signal, a pair of transistors each having an emitter and collector and one thereof having a base, said second input means being connected to the base of said one transistor for applying such second input signal thereto, and a network coupling the emitters of said transistors so that such second input signal applied to the base of said one transistor is duplicated at the emitter of the other transistor, said pair of output means also being respectively connected with the collectors of said transistors so that a phase-inverted amplified reproduction of such second input signal is delivered to the output means connected to said one transistor and an amplified duplicate of such second input signal is delivered to the other output means, whereby the resultant appearing at one of said output means is essentially the sum of the two signals delivered thereto and the resultant output appearing at the other of said output means is essentially the difference between the two outputs delivered thereto.

2. A circuit for accepting first and second input signals to develop two output signals therefrom one of which is proportional to the approximate arithmetic sum of and the other of which is proportional to the approximate arithmetic difference between the two input signals, comprising: first and second input means adapted to have such first and second input signals respectively applied thereto, a pair of output means, a signal duplication network interconnecting said first input means with said pair of output means for delivering to each a duplicate of such first input signal, a pair of transistors each having an emitter, a base and collector, said second input means including a coupling network connected to the base of one of said transistors for applying such second input signal thereto, a network coupling the emitters of said transistors so that such second input signal applied to the base of said one transistor is duplicated at the emitter of the other transistor, signal isolation means connecting the base of said transistors and isolating such second input signal from the base of said other transistor, voltage reference means for connection across a voltage supply and being connected to the base of said other transistor to maintain the biasing voltage applied to the base of each transistor substantially constant, and a current-limiting network for connection to such voltage supply and being connected in series with the emitters of said transistors, said pair of output means also being respectively connected with the collectors of said transistors so that a phase-inverted amplified reproduction of such second input signal is delivered to the output means connected to said one transistor and an amplified duplicate of such second input signal is delivered to the other output means, whereby the resultant output appearing at one of said output means is essentially the sum of the two output signals delivered thereto and the resultant output appearing at the other of said output means is essentially the difference between the two output signals delivered thereto.

3. A circuit for accepting first and second input signals to develop two output signals therefrom one of which is proportional to the approximate arithmetic sum of and the other of which is proportional to the approximate arithmetic difference between the two input signals, comprising: a first pair of transistors each having an emitter and collector, a first coupling network for applying such first input signal to the emitter of each of said transistors, a pair of output means respectively connected to the collectors of said transistors so that the amplified duplicates provided by said transistors of such first input signal are respectively delivered to said output means, a second pair of transistors each having an emitter and collector and one thereof having a base, a second coupling network for applying such second input signal to the base of said one transistor in said second pair thereof, and a network coupling the emitters of said second pair of transistors so that such second input signal applied to the base of said one transistor in said second pair thereof is duplicated at the emitter of the other transistor in said second pair, said pair of output means also being respectively connected with the collectors of said second pair of transistors so that a phase-inverted amplified reproduction of such second input signal is delivered to the output means connected to said one transistor in said second pair thereof and an amplified duplicate of such second input signal is delivered to the other output means, whereby the resultant output appearing at one of said output means is essentially the sum of the two transistor outputs delivered thereto and the resultant output appearing at the other of said output means is essentially the difference between the two transistor outputs delivered thereto.

4. A circuit for accepting first and second input signals to develop two output signals therefrom one of which is proportional to the approximate arithmetic sum of and the other of which is proportional to the approximate arithmetic difference between the two input signals, comprising: a first pair of transistors each having an emitter, base and collector, a first coupling network for applying such first input signal to the emitter of each of said transistors, a pair of output means respectively connected to the collectors of said transistors so that the amplified duplicates provided by said transistors of such first input signal are respectively delivered to said output means, voltage reference means for connection across a voltage supply and being connected to the base of each of said transistors to maintain the biasing voltage applied to such bases substantially constant, a pair of current-limiting devices for connection to such voltage supply and being respectively connected in series with the emitters of said transistors, a second pair of transistors each having an emitter, base and collector, a second coupling network for applying such second input signal to the base of one of said second pair of transistors, a network coupling the emitters of said second pair of transistors so that such second input signal applied to the base of said one transistor in said second pair thereof is duplicated at the emitter of the other transistor in said second pair, signal isolation means connecting the bases of said second pair of transistors and isolating such second input signal from the base of said other transistor, voltage reference means for connection across a voltage supply and being connected to the base of said other transistor to maintain the biasing voltage applied to the base of each of said second pair of transistors substantially constant, and a current-limiting network for connection to such voltage supply and being connected in series with the emitters of said second pair of transistors, said pair of output means also being respectively connected with the collectors of said second pair of transistors so that a phase-inverted amplified reproduction of such second input signal is delivered to the output means connected to said one transistor in said second pair thereof and an amplified duplicate of such second input signal is delivered to the other output means, whereby the resultant output appearing at one of said output means is essentially the sum of the two transistor outputs delivered thereto and the resultant output appearing at the other of said output means is essentially the difference between the two transistor outputs delivered thereto.

5. A circuit for accepting first and second input signals to develop two output signals therefrom one of which is proportional to the approximate arithmetic sum of and the other of which is proportional to the approximate arithmetic difference between the two input signals, comprising: a first pair of transistors each having an emitter, base and collector, a pair of resistances respectively connected in series with said emitters for coupling the same to a voltage supply, a first coupling network including a pair of resistances respectively connected to said emitters for applying such first input signal thereto, a pair of output means respectively connected to the collectors of said transistors so that the amplified duplicates provided by said transistors of such first input signal are respectively delivered to said output means, said bases being interconnected and a reference diode connected therewith for coupling the same with such voltage supply to maintain the biasing voltage applied to said bases substantially constant, a second pair of transistors each having an emitter, base and collector, a second coupling network for applying such second input signal to the base of one of said second pair of transistors, a resistance connecting the bases of said second pair of transistors and isolating such second input signal from the base of the other of said transistors comprising said second pair, a reference diode connected to the base of said other transistor in said second pair thereof for coupling each base with such voltage supply to maintain the biasing voltage applied to these bases substantially constant, a resistance coupling the emitters of said second pair of transistors so that such second input signal applied to the base of said one transistor in said second pair thereof is duplicated at the emitter of the other transistor in said second pair, and a resistance network connected in series with the emitters of said second pair of transistors for coupling the same to such voltage supply, said pair of output means also being respectively connected with the collectors of said second pair of transistors so that a phase-inverted amplified reproduction of such second input signal is delivered to the output means connected to said one transistor in said second pair thereof and an amplified duplicate of such second input signal is delivered to the other output means, whereby the resultant output appearing at one of said output means is essentially the sum of the two transistor outputs delivered thereto and the resultant output appearing at the other of said output means is essentially the difference between the two transistor outputs delivered thereto.

6. The circuit of claim 5 in which said resistances connecting said first input means with the emitters of said first pair of transistors are each variable.

7. The circuit of claim 6 in which a pair of capacitances are respectively connetced in parallel with the resistances comprised in said first coupling network to compensate said circuit for shunt capacitances therein.

8. The circuit of claim 7 in which aforesaid resistance network comprises a pair of resistances respectively connected in series with the emitters of said second pair of transistors.

9. The circuit of claim 8 in which each of said resistances comprised by the aforesaid resistance network is variable.

10. The circuit of claim 7 in which said resistance coupling the emitters of said second pair of transistors comprises a resistor having a variable tap, and in which the aforesaid resistance network comprises a variable resistance connected to said variable tap.

11. The circuit of claim 7 in which said first input means also includes a blocking capacitance so that such first input signal is applied therethrough.

12. The circuit of claim 7 in which a current-limiting resistance is connected in series between said reference diodes.

References Cited by the Examiner

UNITED STATES PATENTS 3,123,779 3/1964 Stumpers et al. ------ 330—69

ARTHUR GAUSS, *Primary Examiner.*

R. H. EPSTEIN, *Examiner.*